United States Patent
Park et al.

(10) Patent No.: US 9,092,871 B2
(45) Date of Patent: Jul. 28, 2015

(54) IMAGE PROCESSING METHOD AND STEREOSCOPIC IMAGE DISPLAY DEVICE USING THE SAME

(75) Inventors: Myungsoo Park, Seoul (KR); Jaewoo Lee, Paju-si (KR); Hyejin Kim, Goyang-si (KR); Jeongki Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 536 days.

(21) Appl. No.: 13/472,361

(22) Filed: May 15, 2012

(65) Prior Publication Data

US 2012/0293502 A1    Nov. 22, 2012

(30) Foreign Application Priority Data

May 16, 2011    (KR) .................. 10-2011-0045668

(51) Int. Cl.
*H04N 13/00* (2006.01)
*G06T 7/00* (2006.01)

(52) U.S. Cl.
CPC .......... *G06T 7/0085* (2013.01); *H04N 13/0018* (2013.01)

(58) Field of Classification Search
CPC .................................................. G06T 7/0079
USPC .......................................................... 345/419
See application file for complete search history.

(56) References Cited

U.S. PATENT DOCUMENTS

| | | |
|---|---|---|
| 2006/0033936 A1* | 2/2006 | Lee et al. .................. 358/1.2 |
| 2007/0035557 A1* | 2/2007 | Choe et al. .................. 345/613 |
| 2007/0098290 A1* | 5/2007 | Wells ......................... 382/254 |
| 2008/0056604 A1* | 3/2008 | Choe et al. .................. 382/269 |
| 2010/0060717 A1* | 3/2010 | Klein Gunnewiek et al. .. 348/43 |
| 2010/0103249 A1* | 4/2010 | Lipton et al. ................. 348/51 |
| 2010/0321390 A1* | 12/2010 | Kim et al. .................... 345/427 |
| 2011/0037835 A1* | 2/2011 | Morino et al. ................ 348/51 |
| 2011/0210965 A1* | 9/2011 | Thorpe ........................ 345/419 |
| 2011/0211042 A1* | 9/2011 | Thorpe et al. ................ 348/43 |
| 2011/0229014 A1* | 9/2011 | Knee et al. ................... 382/154 |
| 2012/0057776 A1* | 3/2012 | Tao et al. ..................... 382/154 |
| 2012/0176367 A1* | 7/2012 | Genova et al. ............... 345/419 |
| 2012/0268461 A1* | 10/2012 | Park et al. .................... 345/419 |
| 2013/0016095 A1* | 1/2013 | Park et al. .................... 345/419 |
| 2013/0038701 A1* | 2/2013 | Hung et al. ................... 348/49 |

* cited by examiner

*Primary Examiner* — Kee M Tung
*Assistant Examiner* — Ryan M Gray
(74) *Attorney, Agent, or Firm* — Fenwick & West LLP

(57) ABSTRACT

A stereoscopic image display device and method of removing jagging of a stereoscopic image. The method comprises: detecting left edges and right edges by analyzing left-eye image data and right-eye image data; detecting a row line as a complicated line if a number of the left edges or the right edges in the row line is equal to or more than a complicated line threshold value, and counting a number of complicated lines; generating a complexity signal having a first logic level if the number of the complicated lines is equal to or more than a complexity detection threshold value; and generating the complexity signal having a second logic level if the number of the complicated lines is less than the complexity detection threshold value.

16 Claims, 18 Drawing Sheets

| <ORGBL> | <ORGBR> |
|---|---|
| 1L | 1R |
| 2L | 2R |
| 3L | 3R |
| 4L | 4R |
| ⋮ | ⋮ |
| 1079L | 1079R |
| 1080L | 1080R |

< RGB3D >

| 1L |
|---|
| 2L |
| 3L |
| 4L |
| ⋮ |
| 1079L |
| 1080L |

< RGBL >

| 1R |
|---|
| 2R |
| 3R |
| 4R |
| ⋮ |
| 1079R |
| 1080R |

< RGBR >

FIG. 12

| 1L |
|---|
| 2L |
| 3L |
| 4L |
| ⋮ |
| 1079L |
| 1080L |

< RGBL >

| 1R |
|---|
| 2R |
| 3R |
| 4R |
| ⋮ |
| 1079R |
| 1080R |

< RGBR >

| 1L |
|---|
| 2R |
| 3L |
| 4R |
| ⋮ |
| 1079L |
| 1080R |

< RGB3D' (nth frame) >

| 2L |
|---|
| 1R |
| 4L |
| 3R |
| ⋮ |
| 1080L |
| 1079R |

< RGB3D' ((n+1)th frame) >

IMAGE PROCESSING METHOD AND STEREOSCOPIC IMAGE DISPLAY DEVICE USING THE SAME

CROSS-REFERENCE TO RELATED APPLICATION(S)

This application claims priority under 35 U.S.C. §119(a) of Korean Patent Application No. 10-2011-0045668, filed on May 16, 2011, which is incorporated by reference herein in its entirety.

BACKGROUND

1. Technical Field

The following description relates to an image processing method and a stereoscopic image display device using the same, which removes jagging occurring while implementing the stereoscopic image (hereinafter, referred as a "three-dimensional (3D) image") in a patterned retarder method.

2. Discussion of the Related Art

Techniques for implementing a stereoscopic image display device to display three-dimensional (3D) images are classified as either a stereoscopic technique or an autostereoscopic technique. Generally, a stereoscopic technique creates or enhances the illusion of depth in an image by presenting two offset images separately to the left eye and the right eye of the user viewing the 3D image and requires the use of glasses to view the 3D image. The stereoscopic technique uses a binocular parallax image between the left and right eyes of a viewer and includes a glasses method and a non-glasses method. The glasses method is classified into a patterned retarder method (hereinafter, referred to as a "PR type") and a shutter glasses method. In the PR type, it is possible to implement a three-dimensional (3D) image by using polarization glasses after displaying the binocular parallax image on a direct view-based display device or a projector by changing polarization direction. In the shutter glass method, it is possible to implement a 3D image by using liquid crystal shutter glasses after displaying the binocular parallax image on a direct view-based display device or a projector in a time division manner. In the non-glasses method, it is possible to implement a 3D image by using an optical plate such as a parallax barrier or a lenticular lens for separating an optical axis of the binocular parallax image.

FIG. 1 illustrates an exploded perspective view of a conventional PR type stereoscopic image display device. With reference to FIG. 1, the PR type stereoscopic image display device implements the 3D image using a polarization characteristic of a patterned retarder PR disposed on a display panel DIS and polarization characteristic of polarized glasses PG which a user wears. The PR type stereoscopic image display device displays a left-eye image on odd-numbered lines of the display panel DIS and displays a right-eye image on even-numbered lines of the display panel DIS. The left-eye image is converted into left-circularly polarized light by the patterned retarder PR. The right-eye image is converted into right-circularly polarized light by the patterned retarder PR. A left eye polarizing filter of the polarized glasses PG passes through only the left-circularly polarized light, and a right eye polarizing filter of the polarized glasses PG passes through only the right-circularly polarized light. Therefore, the user views only the left-eye image through his or her left eye and views only the right-eye image through his or her right eye.

FIG. 2 illustrates a photograph of a 3D image on which jagging is visible. With reference to FIG. 2, a 3D image displays a line, but the user may view that the line is cut off in an area A, which is shown under a polarizing lens taped to the image. That is, in case of the PR type stereoscopic image display device, a boundary portion of the 3D image such as between an object and another object or between an object and a background may be unevenly shown, for example, in steps. Such a phenomenon is known as "jagging," "jagness," or a "zigzag artifact." In the following description, a shape in a 3D image that looks like a step pattern is referred to as "jagging."

SUMMARY

The embodiments herein relate to an image processing method and a stereoscopic image display device using the same.

One object of the embodiments provides an image processing method and a stereoscopic image display device using the same which remove jagging occurring when a stereoscopic image display device implements a 3D image in a patterned retarder method.

Another object of the embodiments provides an image processing method and a stereoscopic image display device using the same which improves a readability of letters displayed on a chat window area when the stereoscopic image display device implements a 3D image in a patterned retarder method.

To achieve these objects and other advantages and in accordance with the purpose according to one aspect of the invention, an image processing method comprises: detecting left edges and right edges of an image by analyzing left-eye image data and right-eye image data; detecting a row line as a complicated line if a number of the left edges or the right edges in the row line is greater than or equal to a complicated line threshold value; counting a number of complicated lines; generating a complexity signal having a first logic level if the number of the complicated lines is greater than or equal to a complexity detection threshold value; and generating the complexity signal having a second logic level if the number of the complicated lines is less than the complexity detection threshold value.

In another aspect, a stereoscopic image display device comprises: a display panel including scan lines and data lines; an image processor configured to detect a complexity of a 3D image by using a complexity detector, and convert 3D image data by applying algorithms differently according to the complexity of the 3D image; a data driver configured to convert converted 3D image data from the image processor into data voltages and supply the data voltages to the data lines; and a gate driver configured to sequentially supply gate pulses synchronized with the data voltage to the gate lines. In one embodiment, the complexity detector includes: an edge detector configured to detect left edges and right edges by analyzing left-eye image data and right-eye image data, and a complexity calculator configured to detect a row line as a complicated line if a number of the left edges or the right edges in the row line is equal to or more than a complicated line threshold value, and count a number of complicated lines, and generate a complexity signal having a first logic level if the number of the complicated lines is greater than or equal to a complexity detection threshold value, and generate the complexity signal having a second logic level if the number of the complicated lines is less than the complexity detection threshold value.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIG. 7 illustrates a chart of an arrangement of original 3D image data, an arrangement of left-eye image data, and arrangement of right-eye image data according to one embodiment.

FIG. 12 illustrates a chart of an example of a 3D format method according to one embodiment.

DETAILED DESCRIPTION

Figure 1:
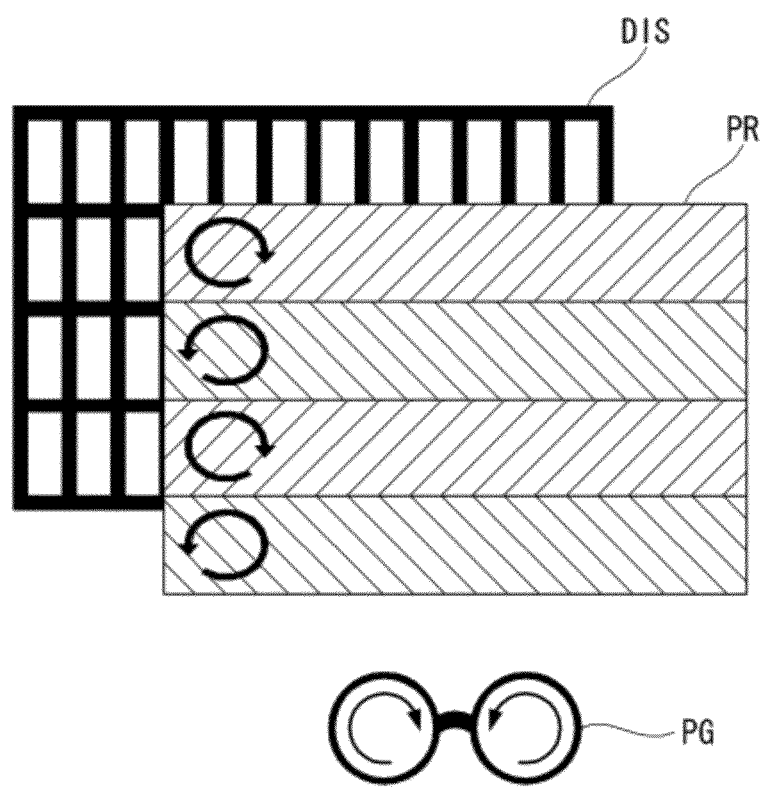
FIG. 1 illustrates an exploded perspective view of a conventional PR type stereoscopic image display device.
Figure 2:
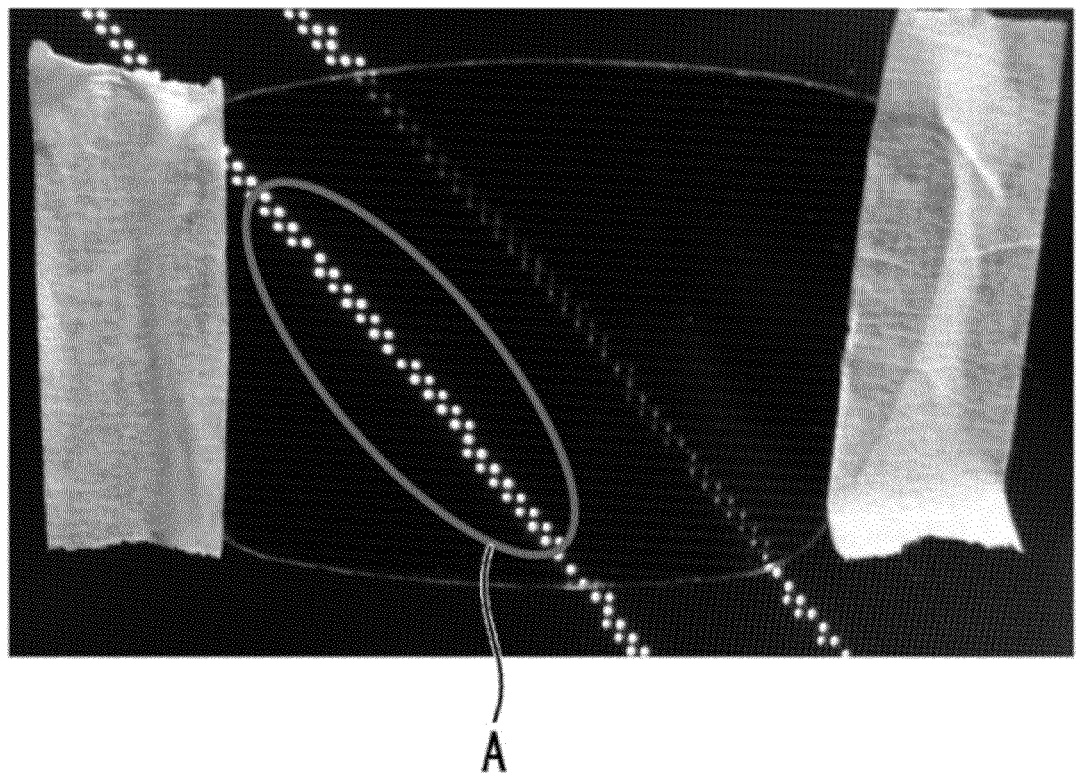
FIG. 2 illustrates a photograph of a 3D image on which jagging is visible.
Figure 3:
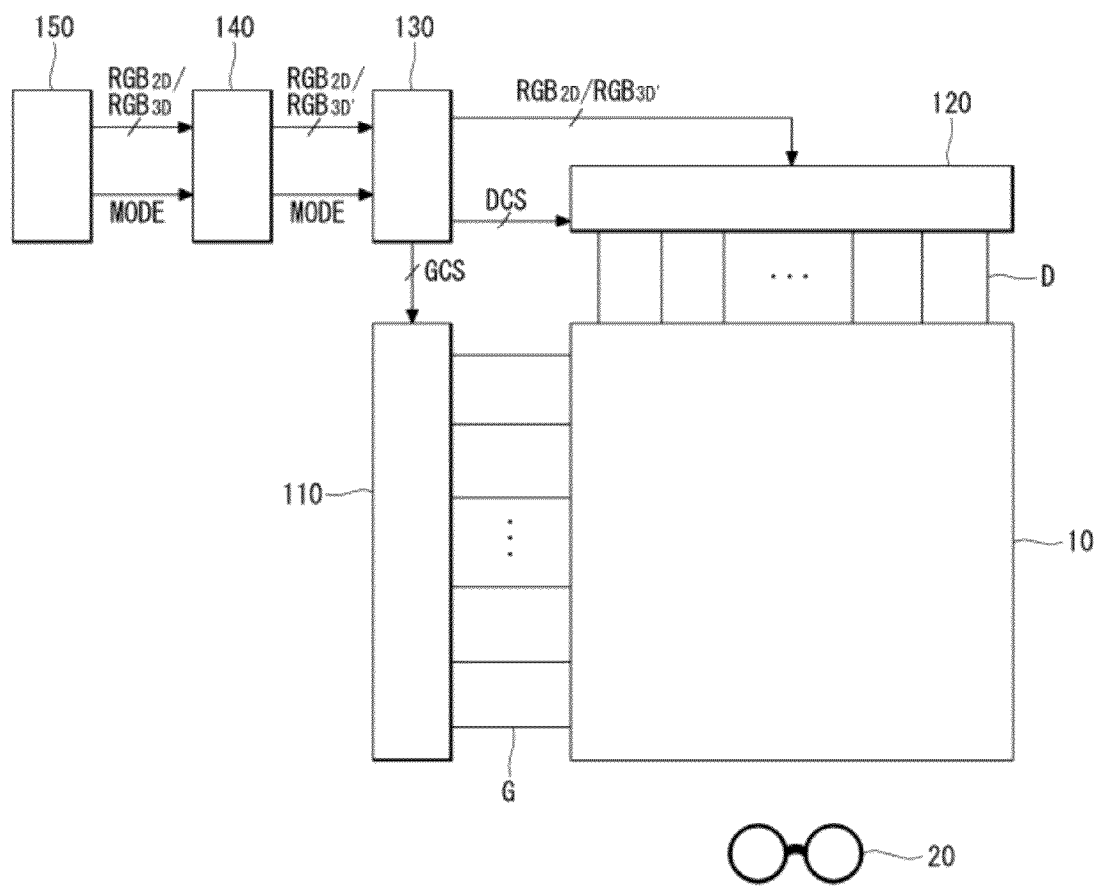
FIG. 3 illustrates a block diagram schematic of a stereoscopic image display device according to one embodiment.
Figure 4:
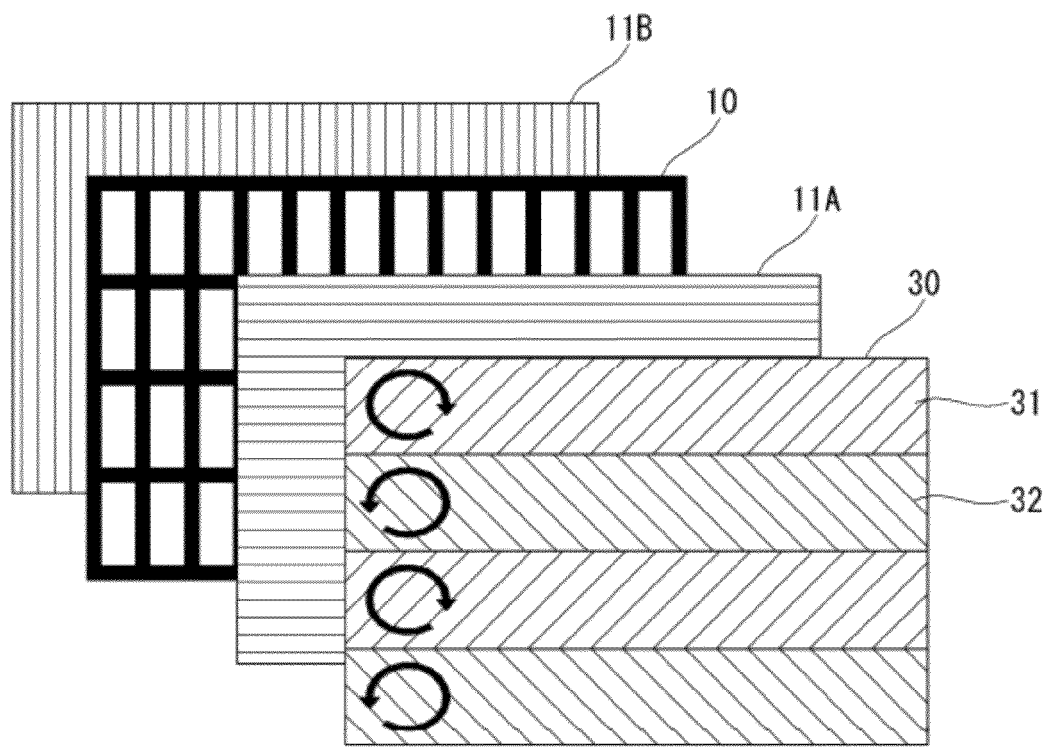
FIG. 4 illustrates an exploded perspective view of a display panel, a patterned retarder, and the polarization glasses of the stereoscopic image display device according to one embodiment.
Figure 4:
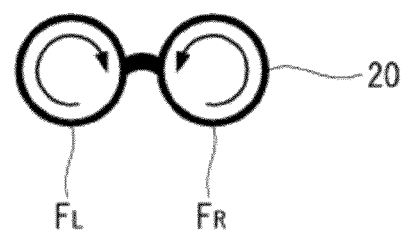

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted FIG. 3 illustrates a block diagram schematic of a stereoscopic image display device according to one embodiment. FIG. 4 illustrates an exploded perspective view of a display panel, a patterned retarder, and polarization glasses of the stereoscopic image display device. The stereoscopic image display device according to one embodiment may be implemented as a flat panel display such as a liquid crystal display (LCD), a field emission display (FED), a plasma display panel (PDP) display, and an organic light emitting diode (OLED) display. In the following description, the liquid crystal display (LCD) is described as an example of the stereoscopic image display device. However, embodiments are not limited thereto. For example, other kinds of flat panel display, such as FED, PDP, and OLED, may be used.

With reference to FIGS. 3 and 4, the stereoscopic image display device according to an embodiment includes a display panel 10, polarization glasses 20, a gate driver 110, a data driver 120, a timing controller 130, an image processor 140, and a host system 150. The display panel 10 includes a thin film transistor (TFT) substrate and a color filter substrate (not shown). A liquid crystal layer (not shown) is formed between the TFT substrate and the color filter substrate. Data lines D and gate lines (or scan lines) G crossing over the data lines D are formed on the TFT substrate. Pixels are arranged in a matrix form in cell areas defined by the data lines D and the gate lines G. A TFT formed at each of the crossings of the data lines D and the gate lines G transfers a data voltage supplied via the data line D to a pixel electrode of the liquid crystal cell in response to a gate pulse supplied through the gate line G. A common voltage is supplied to a common electrode. Each of the pixels is driven by an electric field between the pixel electrode and the common electrode.

A color filter array (not shown), including a black matrix and color filter, is formed on the color filter substrate. The common electrode is formed on the color filter substrate in a vertical electric field driving manner, such as a twisted nematic (TN) mode and a vertical alignment (VA) mode. The common electrode is formed on the TFT substrate along with the pixel electrode in a horizontal electric field driving manner, such as an in-plane switching (IPS) mode and a fringe field switching (FFS) mode. The display panel 10 may be implemented in any liquid crystal mode such as the TN, VA, IPS, and FFS modes.

The display panel 10 may be implemented as a transmissive type liquid crystal panel modulating light from a backlight unit (not shown). The backlight unit includes a plurality of light sources, a light guide plate (or a diffusion plate), a plurality of optical sheets, and the like. The backlight unit may be implemented as an edge type backlight unit or a direct type backlight unit. The light sources of the backlight unit may include at least one of a hot cathode fluorescent lamp (HCFL), a cold cathode fluorescent lamp (CCFL), an external electrode fluorescent lamp (EEFL), and a light emitting diode (LED).

With reference to FIG. 4, an upper polarizing plate 11A is attached to the color filter substrate and a lower polarizing plate 11B is attached to the TFT substrate. Alignment layers for setting pre-tilt angles of liquid crystals are respectively formed on the TFT substrate and the color filter substrate. A spacer (not shown) is formed between the TFT substrate and the color filter substrate to maintain a cell gap of the liquid crystal layer.

The display panel 10 displays a two-dimensional (2D) image on odd-numbered lines and even-numbered lines thereof in a 2D mode. The display panel 10 displays a left-eye or right-eye image on the odd-numbered lines and displays a right-eye or left-eye image on the even-numbered lines in a three-dimensional (3D) mode. The image displayed on the display panel 10 is incident on a patterned retarder 30 disposed on the display panel 10 through the upper polarizing plate 11A.

The patterned retarder 30 includes first retarders 31 formed on the odd-numbered lines of the patterned retarder 30 and second retarders 32 formed on the even-numbered lines of the patterned retarder 30. The first retarders 31 may be positioned opposite the odd-numbered lines of the display panel 10 and the second retarders 32 may be positioned opposite to the even-numbered lines of the display panel 10. The first retarders 31 may convert the light incident from the display panel 10 into a first circularly polarized light (for example, a left circularly-polarized light). The second retarders 32 may convert the light incident from the display panel 10 into a second circularly polarized light (for example, a right circularly-polarized light). Meanwhile, the patterned retarder 30 may include a black stripe for widening a vertical viewing angle.

The polarization glasses 20 include a left-eye polarization filter $F_L$ through which the first circularly polarized light converted by the first retarders 31 passes and a right-eye polarization filter $F_R$ through which the second circularly polarized light converted by the second retarders 32 passes. For example, the left-eye polarization filter $F_L$ can pass through the left circularly-polarized light, and the right-eye polarization filter $F_R$ can pass through the right circularly-polarized light.

In the example PR (patterned retarder) type stereoscopic image display device, the display panel 10 may display the left image on the odd-numbered lines of the first retarders 31 of the patterned retarder 30, and may convert the left image into the first circularly-polarized light. The left-eye polarization filter $F_L$ may pass through the first circularly-polarized light. Thus, a user may view only a left image through his or her left eye. Also, the display panel 10 may display the right image on the even-numbered lines of the second retarders 32 of the patterned retarder 30, and may convert the right image into the second circularly-polarized light. Also, the right-eye polarization filter $F_R$ may pass through the second circularly-polarized light. Thus, a user may view only right image through his or her right eye.

The data driver 120 may include a plurality of source driver integrated circuits (ICs) (not shown). The source driver ICs may receive 2D image data $RGB_{2D}$ or converted 3D image data $RGB_{3D'}$ from the timing controller 130. The source driver ICs may convert the 2D image data $RGB_{2D}$ or the converted 3D image data $RGB_{3D'}$ received from the timing controller 130 into positive or negative polarity gamma compensation voltage. The source driver ICs may supply the positive and negative analog data voltages to the data lines D of the display panel 10.

The gate driver 110 may sequentially supply gate pulses synchronized with the data voltage to the gate lines G of the display panel 10 under the control of the timing controller 130. The gate driver 110 may include a plurality of gate driver ICs (not shown). Each of the gate driver ICs may include a shift register, a level shifter for converting an output signal of the shift register into a signal having a swing width suitable for a TFT drive of the liquid crystal cell, an output buffer, and the like.

The timing controller 130 may receive 2D image data $RGB_{2D}$ or the converted 3D image data $RGB_{3D'}$, timing signals, and a mode signal MODE from the image processor 140. The timing controller 130 may generate a gate control signal GCS for controlling the gate driver 110 and a data control signal DCS for controlling the data driver 120, based on the 2D image data $RGB_{2D}$ or the converted 3D image data $RGB_{3D'}$, the timing signals, and the mode signal MODE. The timing signals may include a vertical synchronization signal, a horizontal synchronization signal, a data enable signal, a dot clock, etc. The timing controller 130 may output the gate control signal GCS to the gate driver 110. The timing controller 130 may output the 2D image data $RGB_{2D}$ or the converted 3D image data $RGB_{3D'}$ and the data control signal DCS to the data driver 120.

The host system 150 may supply the 2D image data $RGB_{2D}$ or original 3D image data $RGB_{3D}$ to the image processor 140 through an interface such as a low voltage differential signaling (LVDS) interface or a transition minimized differential signaling (TMDS) interface. Furthermore, the host system 150 may supply the timing signals and the mode signal MODE, for distinguishing the 2D mode from the 3D mode, to the image processor 140.

The image processor 140 may receive the 2D image data $RGB_{2D}$ from the host system 150 in the 2D mode. The image processor 140 may output the 2D image data $RGB_{2D}$ as it is to the timing controller 130, without converting the 2D image data $RGB_{2D}$ in the 2D mode. The image processor 140 may receive the original 3D image data $RGB_{3D}$ from the host system 150 in the 3D mode. The image processor 140 may remove jagging of the original 3D image data $RGB_{3D}$ and may output the converted 3D image data $RGB_{3D'}$ to the timing controller 130. The image processor 140 may convert timing signals synchronized with a timing of the modulated 3D image data $RGB_{3D'}$, and then may output converted timing signals to the timing controller 130.

The image processor 140 and the method of removing jagging of the 3D image according to the embodiment are described in detail below with reference to FIGS. 5 and 6.

Figure 5:
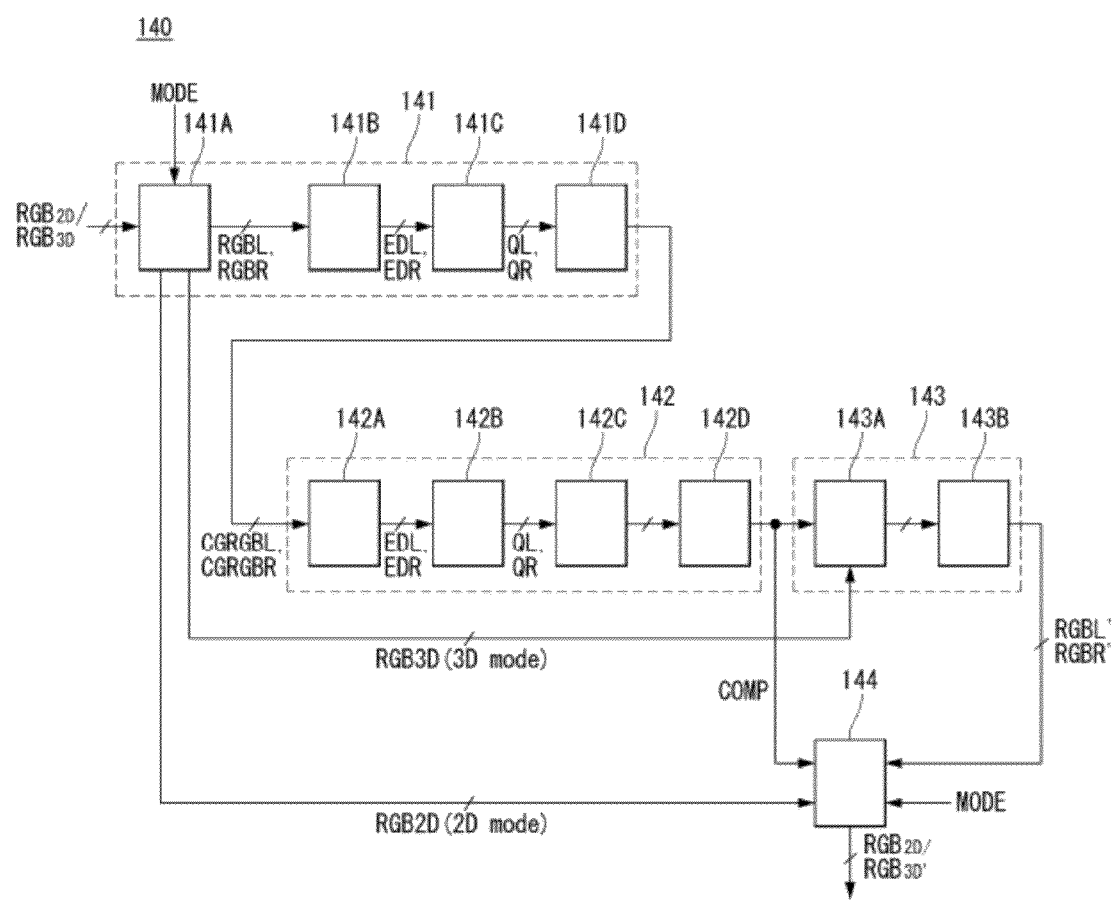
FIG. 5 illustrates a block diagram of an image processor of the stereoscopic image display device according to one embodiment.
Figure 6:
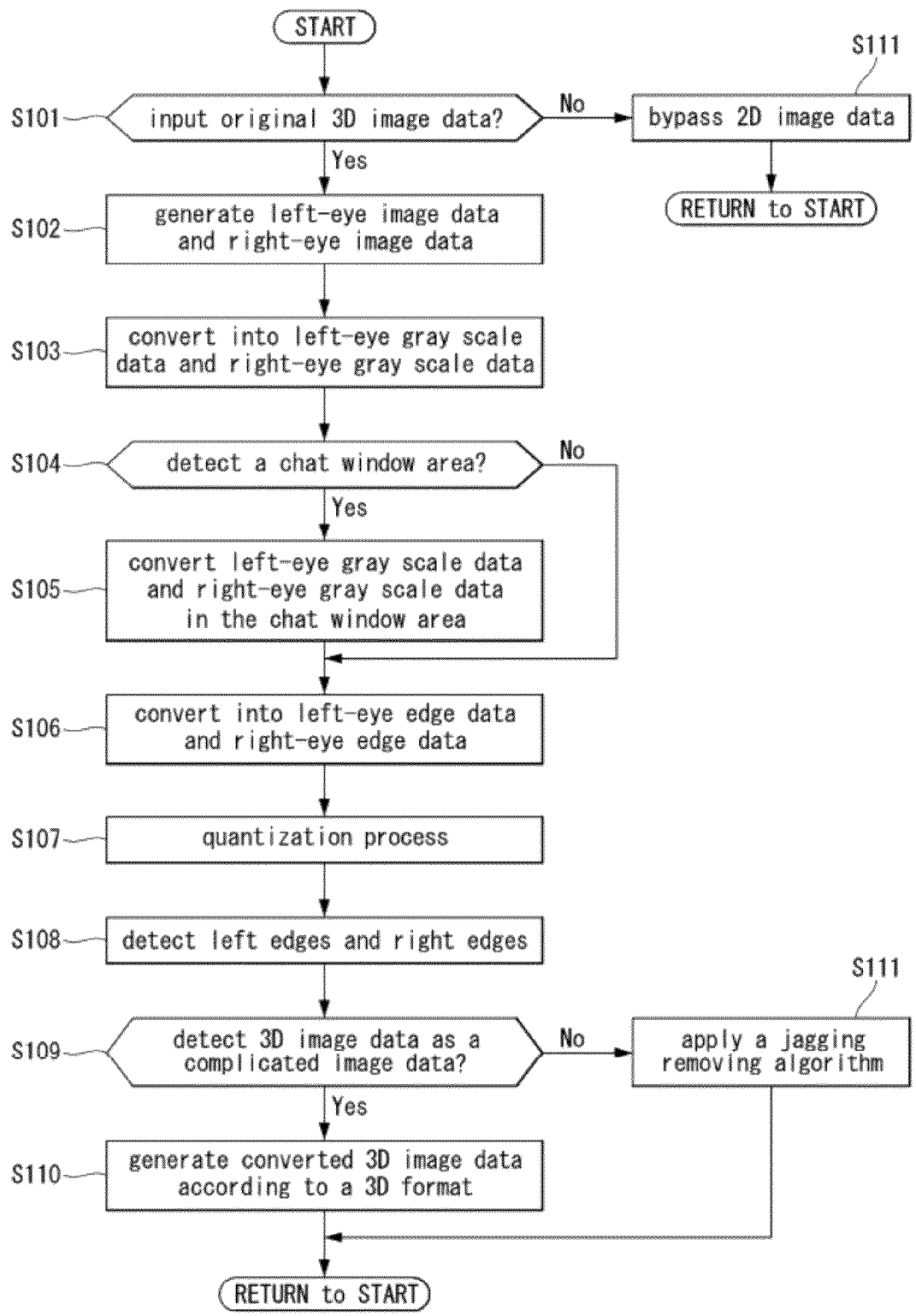
FIG. 6 illustrates a flow chart of an image processing method according to one embodiment.

FIG. 5 illustrates a block diagram of the image processor shown in FIG. 3. FIG. 6 illustrates a flow chart of an image processing method according to one embodiment. With reference to FIG. 5, the image processor 140 may include a chat window detector 141, a complexity detector 142, a jagging removing unit 143, and a 3D formatter 144. The chat window detector 141 may perform operations S101 to S105 shown in FIG. 6. The complexity detector 142 may perform operations S106 to S108 shown in FIG. 6. The jagging removing unit 143 may perform operation S110 shown in FIG. 6. The 3D formatter 144 may perform operations S109 and S111 shown in FIG. 6.

The chat window detector 141 may include data expansion unit 141A, a gray scale converter 141B, a displacement calculator 141C, and a first data converter 141D (a chat window converter). The chat window detector 141 may detect at least one chat window area so that a jagging removing method of the jagging removing unit 143 may not be applied to the chat window area. In one embodiment, a chat window area is an area that displays alphanumeric characters. The readability of letters or numbers in the chat window area becomes poor if the jagging removing method is applied to the chat window area.

The data expansion unit 141A may receive the 2D image data $RG_{B2D}$ or the original 3D image data $RGB_{3D}$ from host system 150. The data expansion unit 141A may receive the mode signal MODE and the timing signals from host system 150. The data expansion unit 141A may distinguish the 2D mode from the 3D mode according to the mode signal MODE. The data expansion unit 141A may bypass the 2D image data $RG_{B2D}$ and timing signals in the 2D mode.

Figure 8A:
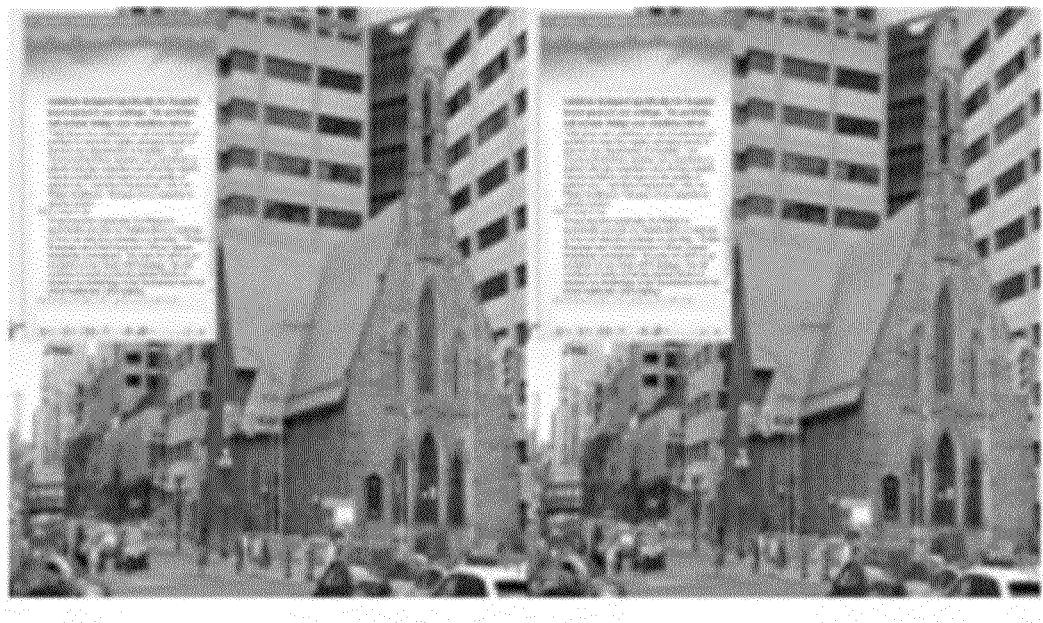
FIG. 8A illustrates a screen shot of an input 3D image according to one embodiment.

FIG. 7 is an example chart illustrating an arrangement of original 3D image data, e.g., an arrangement of left-eye image and an arrangement of right-eye image. FIG. 8A is an example of a screen shot illustrating an input 3D image. With reference to FIGS. 7 and 8A, the original 3D image is an image obtained from the original 3D image data.

The data expansion unit 141A may receive the original 3D image data $RGB_{3D}$ of one frame, including original left-eye image data ORGBL and original right-eye image data ORGBR. The original 3D image data $RGB_{3D}$ may include the original left-eye image data ORGBL arranged in first to $n^{th}$ lines in a left half portion and the original right-eye image data ORGBR arranged in first to $n^{th}$ lines in a right half portion, where n is a number of horizontal lines of the display panel 10. The data expansion unit 141A may generate left-eye image data RGBL of one frame by expanding the original left-eye image data ORGBL, and right-eye image data RGBR of one frame by expanding the original right-eye image data ORGBR. (See S101 and S102 in FIG. 6.)

The gray scale converter 141B converts the left-eye image data RGBL into left-eye gray scale data GRGBL. The gray scale converter 141B converts the right-eye image data RGBR into right-eye gray scale data GRGBR. The gray scale converter 141B may use an equation 1 for conversion of the left-eye image data RGBL and the right-eye image data into their respective gray scale data.

$$GRGBL=0.114 \times RL+0.587 \times GL+0.299 \times BL$$

$$GRGBR=0.114 \times RR+0.587 \times GR+0.299 \times BR \quad \text{[Equation 1]}$$

In equation 1, GRGBL indicates the left-eye gray scale data, and RL indicates red data of the left-eye image data RGBL. GL indicates green data of the left-eye image data RGBL, and BL indicates blue data of the left-eye image data RGBL. GRGBR indicates. the right-eye gray scale data, and RR indicates red data of the right-eye image data RGBR. GR indicates green data of the right-eye image data RGBR, and BR indicates blue data of the right-eye image data RGBR.

Figure 8B:
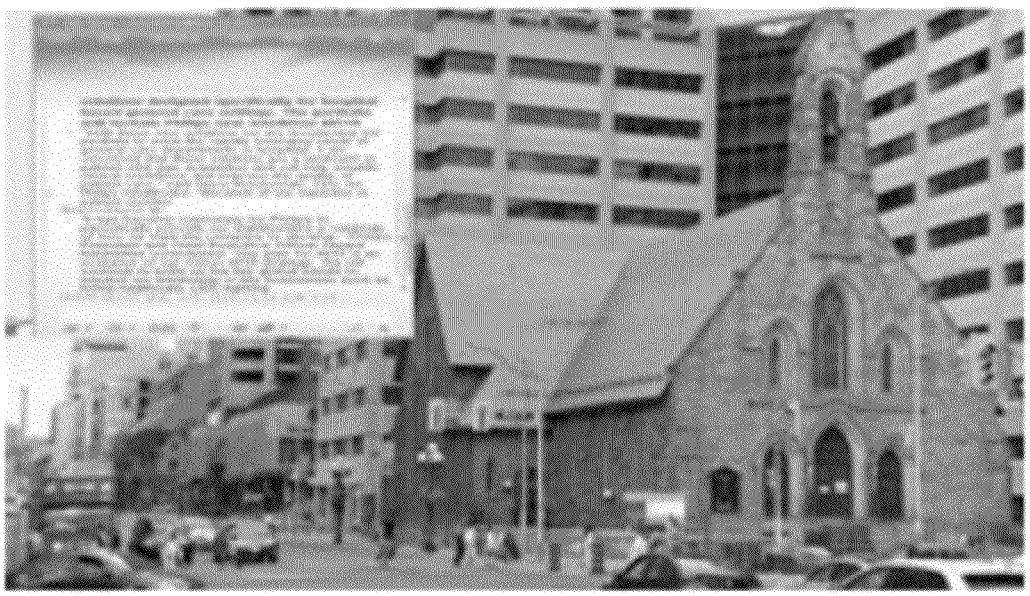
FIG. 8B illustrates a screen shot of a left-eye gray scale image according to one embodiment.

FIG. 8B is an example of a screen shot illustrating a left-eye gray scale image. With reference to FIG. 8B, the left-eye gray scale image is an image obtained from the left-eye gray scale data GRGBL.

Figure 8C:
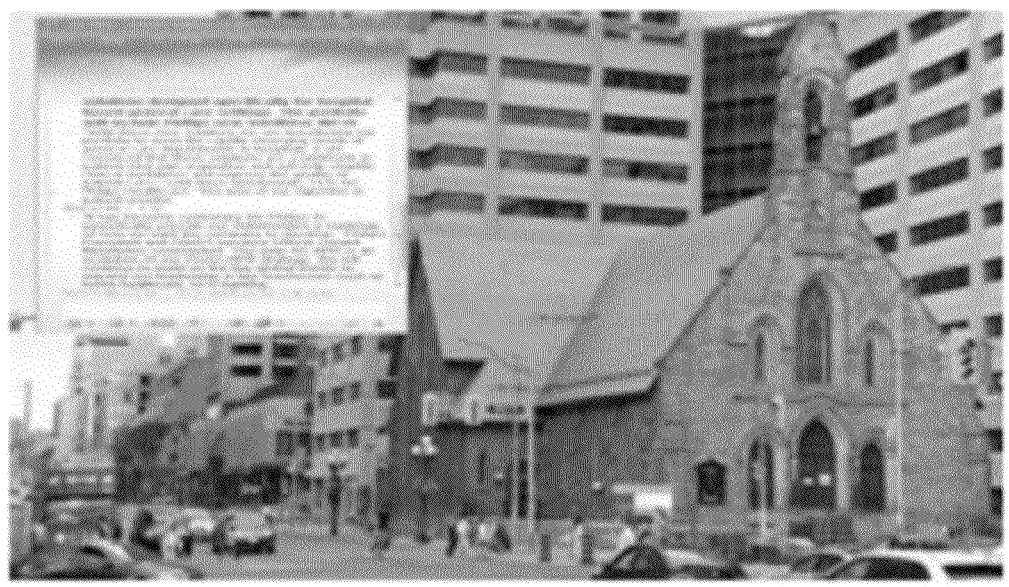
FIG. 8C illustrates a screen shot of a left-eye noise elimination image according to one embodiment.

FIG. 8C is an example of a screen shot illustrating a left-eye noise elimination image. With reference to FIG. 8C, the left-eye noise elimination image is an image obtained from the left-eye gray scale data GRGBL to which a median filter is applied. The gray scale converter 141B may eliminate noises of the left-eye gray scale image by applying a noise elimination filter such as the median filter to the left-eye gray scale data GRGBL. The gray scale converter 141B may eliminate noises of the right-eye gray scale image by applying the noise elimination filter to the right-eye gray scale data GRGBR. (See S103 in FIG. 6.)

Figure 9:
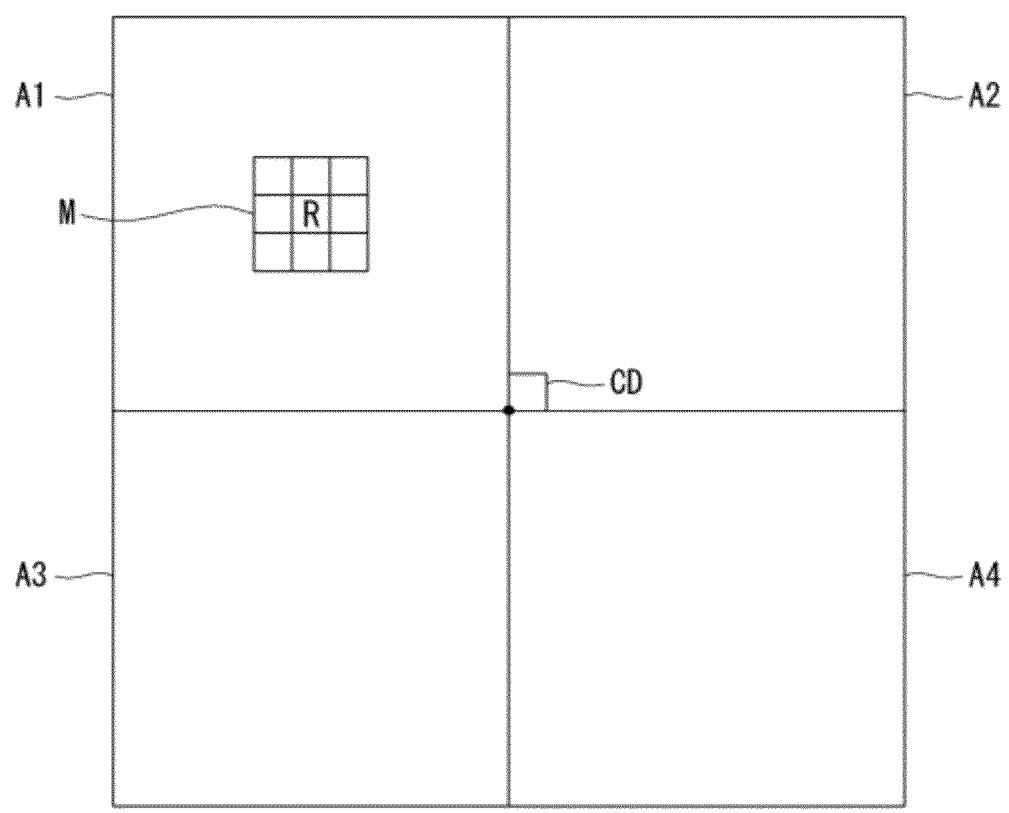
FIG. 9 illustrates a chart of center gray scale data, displacement calculation areas, reference gray scale data, and a mask according to one embodiment.

FIG. 9 illustrates a chart of center gray scale data, displacement calculation areas, reference gray scale data, and a mask. The displacement calculator 141C detects the chat window area by calculating the reference gray scale data of which a displacement is '0' from the center gray scale data. With reference to FIG. 9, the displacement calculator 141C determines one gray scale data of the left-eye gray scale data GRGBL or the right-eye gray scale data as a central gray scale data CD.

The displacement calculator 141C determines a plurality of displacement calculation areas A1, A2, A3, and A4 as shown in FIG. 9 based on the central gray scale data CD. For example, the displacement calculator 141C determines an upper left area of the central gray scale data CD as a first displacement calculation area A1, an upper right area of the central gray scale data CD as a second displacement calculation area A2, a lower left area of the central gray scale data CD as a third displacement calculation area A3, and a lower right area of the central gray scale data CD as a fourth displacement calculation area A4. Each of the displacement calculation areas A1, A2, A3, and A4 includes a plurality of gray scale data.

The displacement calculator 141C sets a mask M on one of the displacement calculation areas A1, A2, A3, and A4. The mask M may have a size of p×q pixels wherein each of p and q is a natural number greater than 2. As shown in FIG. 9, the mask M may be set on a first displacement calculation area A1.

The displacement calculator 141C determines one of gray scale data in the mask M as a reference gray scale data R. For example, the displacement calculator 141C determines pixel gray scale data having a median among pixel gray scale data in the p×q mask M as the reference gray scale data R.

The displacement calculator 141C calculates a first displacement between the central gray scale data CD and the reference gray scale data R. The displacement calculator 141C sequentially calculates the first displacement by moving the p×q mask M until the displacement calculator 141C finds that the first displacement is '0'. For example, if the displacement calculator 141C does not find that the first displacement is '0' on the first displacement calculation area A1, the displacement calculator 141C may set the p×q mask M on the second displacement calculation area A2, and may find that the first displacement is '0'. If the displacement does not find that the first displacement is '0' on all displacement calculation areas A1, A2, A3, and A4, the displacement calculator 141C may not determine that the central gray scale data CD is in the chat window area. If the displacement calculator 141C finds that the first displacement is '0', the displacement calculator 141C may determine that the central gray scale data is in the chat window area.

Figure 10:
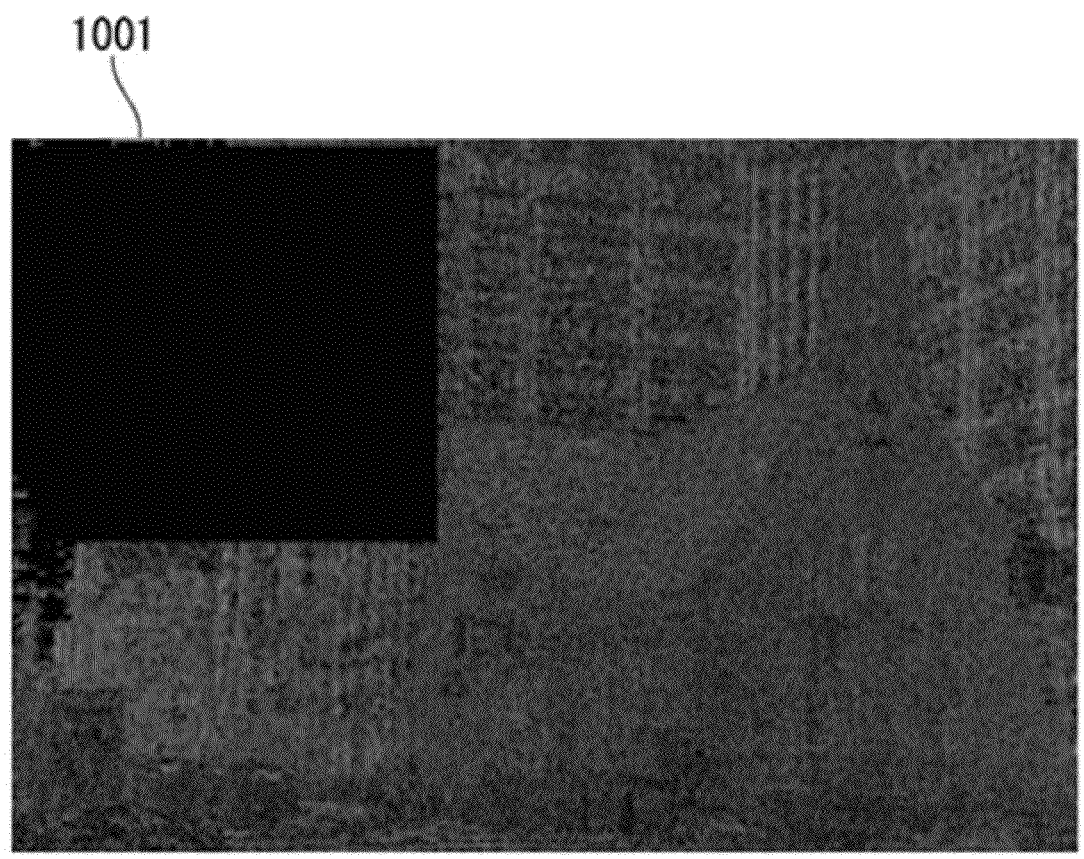
FIG. 10 illustrates a screen shot of a left-eye displacement calculation image according to one embodiment.

FIG. 10 illustrates a screen shot of a left-eye displacement calculation image according to one embodiment. The left-eye displacement calculation image is obtained as converting the left-eye gray scale data in the chat window area into '0' (i.e., zero). With reference to FIG. 10, areas on which the first displacement is '0' displays a black image 1001 because the gray scale data is '0' in the areas on which the first displacement is '0'. Also, the areas displaying the black image 1001 in FIG. 10 are similar to the chat window area in FIG. 8B.

Here, '0' of the first displacement means that both of the central gray scale data CD and the reference gray scale data R on one of the displacement calculation areas A1, A2, A3, and A4 has a same value. That is, because gray scale data in the chat windows areas usually have the same value, the central gray scale data CD may be in the chat window area when both of the central gray scale data CD and the reference gray scale data R on one of the displacement calculation areas A1, A2, A3, and A4 has a same value. Meanwhile, it is better that the chat window area is placed on the same position of the left-eye image and right-eye image respectively. (See S104 in FIG. 6.)

The first data converter 141D converts the central gray scale data CD detected as the chat window area and gray scale data adjacent to the central gray scale data CD into a same value because the gray scale data adjacent to the central gray scale data CD detected as the chat window area may be in the chat window area. Assume that the central gray scale data CD detected as the chat window area is jth gray scale data on a kth line. "j" is a natural number greater than or equal to 1 and less than or equal to m which is a horizontal resolution of the display panel 10. "k" is a natural number greater than or equal to 2 and less than or equal to n, which is a vertical resolution of the display panel 10. The first data converter 141D may convert the jth gray scale data on the kth line, the jth gray scale data on a (k−1)th line, and the jth gray scale data on a (k+1)th line into an arithmetic mean of the jth gray scale data on the kth line, the jth gray scale data on the (k−1)th line, and the jth gray scale data on the (k+1)th line. The first data converter 141D outputs the converted left-eye gray scale data CGRGBL and the converted right-eye gray scale data CGRGBR to the complexity detector 142. (See S105 in FIG. 6.)

Referring back to FIG. 5, the complexity detector 142 includes an edge converter 142A, a quantization processor 142B, an edge detector 142C, and a complexity calculator 142D. If a 3D image is a complicated (i.e., a complex) image, the jagging removing method is not applied because jagging of the complicated image is removed by only a time division 3D format method according to one embodiment. In one embodiment, the complexity of an image is based on the complexity of the lines in the image as will be further described below with respect to the complexity calculator 142D. However, if the 3D image is a simple image, the jagging removing method is applied because jagging of the simple image is not removed by the time division 3D format method. Therefore, the complexity detector 142 detects whether the 3D image is the complicated image so that the jagging removing method is not applied if the 3D image is the complicated image and the jagging removing method is applied if the 3D image is the simple image.

Figure 11A:
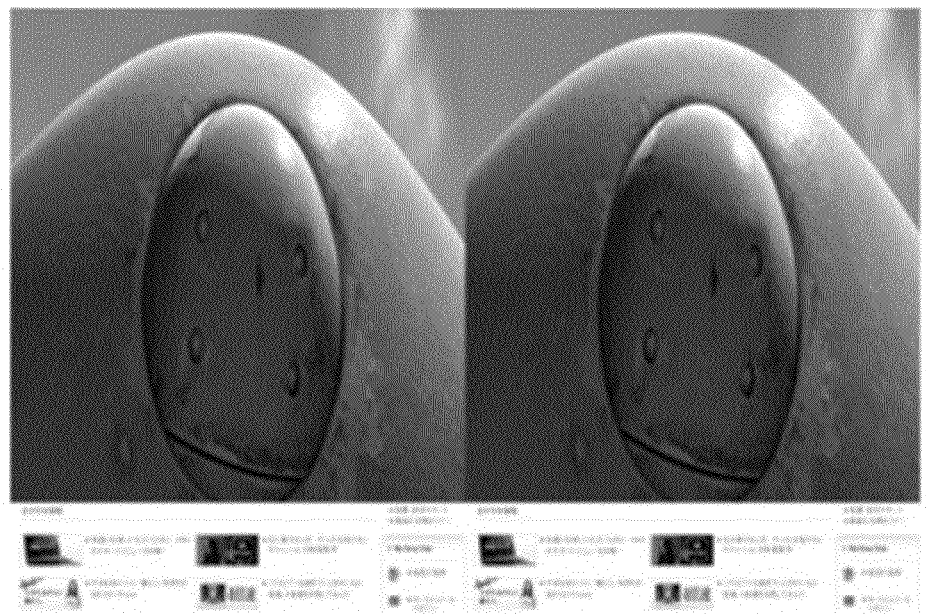
FIG. 11A illustrates a screen shot of a simple 3D image according to one embodiment.
Figure 11B:
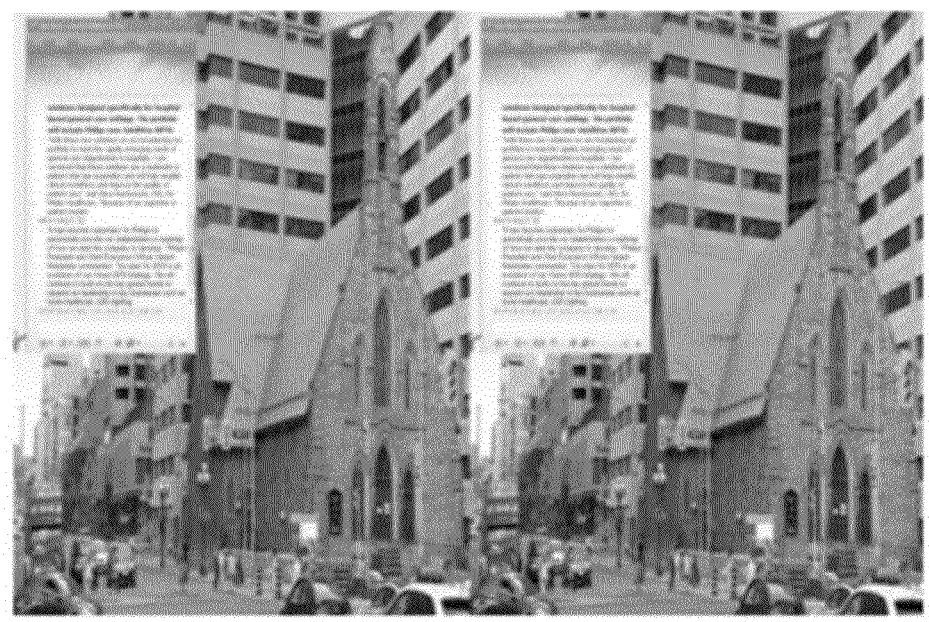
FIG. 11B illustrates a screen shot of a complicated 3D image.

FIG. 11A illustrates screen shot of a simple 3D image according to one embodiment. The simple image is an image having a low complexity as shown in FIG. 11A. FIG. 11B illustrates a screen shot of a complicated 3D image. The complicated image is an image having a high complexity as shown in FIG. 11B.

Referring back to FIG. 5, the edge converter 142A may convert the converted left-eye gray scale data CGRGBL into left-eye edge data EDL, and the converted right-eye gray scale data CGRGBR into right-eye edge data EDR. The edge converter 142A may use an edge conversion algorithm such as a sobel mask (operator) method, and so on, in order to convert the left-eye image data RGBL into left-eye edge data EDL and the right-eye image data RGBR to right-eye edge data EDR. (See S106 in FIG. 6.)

The quantization processor 141C may operate a quantization method which quantizes the left-eye edge data EDL in order to prevent the left-eye edge data in a non-edge area from being detected as the left edges. The quantization processor 141C may operate a quantization method which quantizes the right-eye edge data EDR in order to prevent the right-eye edge data EDR in a non-edge area from being detected as the right edges. The left edges and the right edges may be clearly distinguished from the non-edge area through the quantization method. In one example, the left edges refer to an outline of objects in the left-eye image, and the right edges refer to an outline of objects in the right-eye image.

The quantization processor 142B may generate left-eye quantization data QL by converting the left-eye edge data EDL into a maximum gray level value if the left-eye edge data EDL is greater than a first threshold value (edge data threshold value). The quantization processor 142B may convert the left-eye edge data EDL into a minimum gray level value if the left-eye edge data EDL is less than or equal to the first threshold value. The quantization processor 142B may generate right-eye quantization data QR by converting the right-eye edge data EDR into the maximum gray level value if the right-eye edge data EDR is greater than the first threshold value. The quantization processor 142B may convert the right-eye edge data EDR into the minimum gray level value if the right-eye edge data EDR is less than or equal to the first threshold value. The quantization unit 142B may output the left-eye quantization data QL and the right-eye quantization data QR to the edge detector 142C after finishing the quantization method. Meanwhile, the quantization processor 142B may be omitted. In one example, the edge converter 142A may output left-eye edge data EDL and right-eye edge data EDR to the edge detector 142C.

Figure 8D:
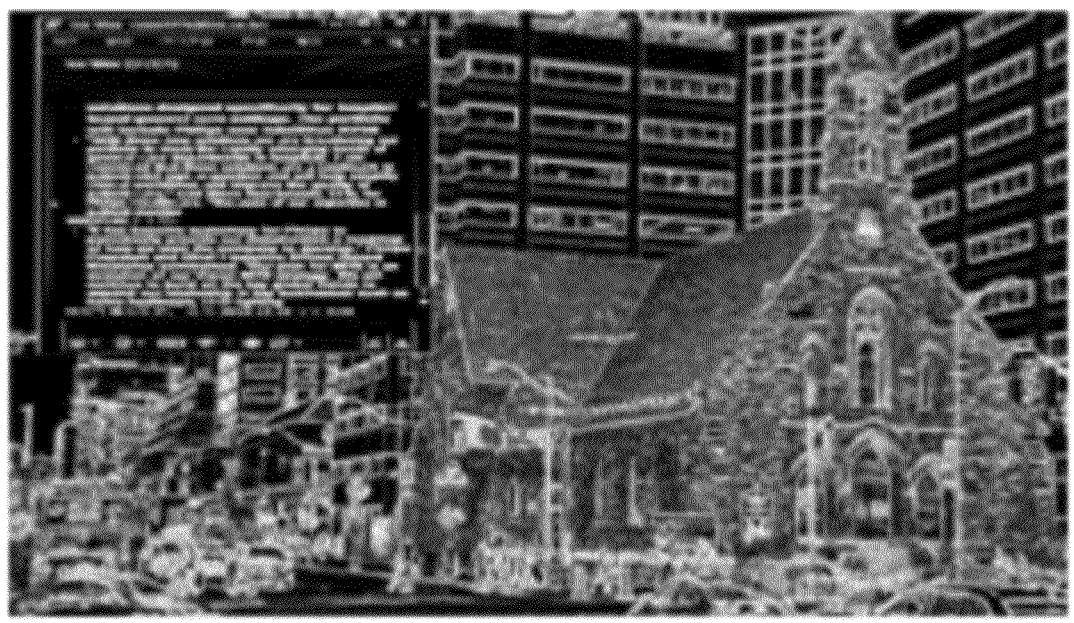
FIG. 8D illustrates a screen shot of a left-eye edge image according to one embodiment.
Figure 8E:
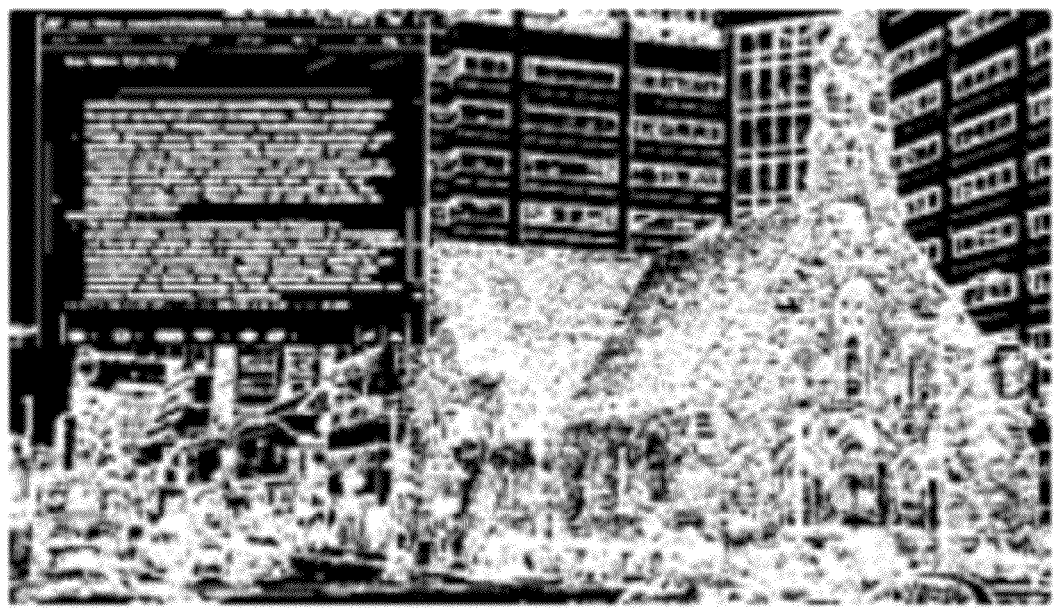
FIG. 8E illustrates a screen shot of a left-eye quantization image according to one embodiment.

FIG. 8D illustrates a screen shot of a left-eye edge image according to one embodiment. FIG. 8E illustrates a screen shot of a left-eye quantization image according to one embodiment. With reference to FIGS. 8D and 8E, the left-eye edge image may be obtained from the left-eye edge data EDL and the left-eye quantization image may be obtained from the left-eye quantization data QL. Also, each of the left-eye edge image and the left-eye quantization image may be represented as gray level values from "G0" to "G255" when input image data is 8 bits. In one example, the maximum gray level may be a gray level value "G255" and the minimum gray level may be a gray level value "G0". As shown in FIGS. 8D and 8E, edges of the left quantization image (or a right quantization image) in FIG. 8E are clearer than those of the left-eye edge image (or the right-eye edge image) in FIG. 8D due to the quantization method. (See S107 in FIG. 6.)

Referring back to FIG. 5, the edge detector 142C may detect the left edges and the right edges because jagging may occur in edges of a left image and the right image. If the quantization processor 142B is omitted, the edge detector 142C may receive left-eye edge data EDL and right-eye edge data EDR from the edge converter 141B. The edge detector 142C may detect the left-eye edge data EDL that is greater than a second threshold value (edge detection threshold value) as the left edges. The edge detector 142C may detect the right-eye edge data EDR that is greater than the second threshold value as the right edges. The second threshold value may be appropriately set.

If the quantization processor 142B is not omitted, the edge detector 142C may receive the left-eye quantization data QL and right-eye quantization data QR from the quantization processor 142B. The edge detector 142C may detect the left-eye quantization data QL that is more than the second threshold value as the left edges. The edge detector 142C may detect the right-eye quantization data QR that is more than the second threshold value as the right edges. (See S108 in FIG. 6.)

With reference to FIGS. 11A and 11B, the complexity of a line is based on the amount of edges on the line. Thus, a complex line has more edges compared to a simple line. Also, a complex image has more complex lines compared to simple images. Therefore, the complexity calculator 142D may calculate a number of complicated lines. A row line is defined as a complicated line when a number of left edges or a number of right edges in the row line is equal to or more than a third threshold value (complicated lines threshold value). The complexity calculator 142D may generate a complexity signal COMP having a first logic level if the number of complicated lines is equal to or more than a fourth threshold value (complexity detection threshold value). The complexity calculator 142D may generate the complexity signal COMP having a second logic level if the number of complicated lines is less than the fourth threshold value. That is, the complexity calculator 142D may determine that the 3D image is a complicated image if the number of complicated lines is greater than or equal to a fourth threshold value. The complexity calculator 142D may determine that the 3D image is a simple image if the number of complicated lines is less than the fourth threshold value. (See S109 in FIG. 6.)

Referring back to FIG. 5, the 3D formatter 144 receives the complexity signal COMP from the complexity calculator 142D, and the left-eye image data RGBL and the right-eye image data RGBR from the data expansion unit 141A. The 3D formatter 144 generates the converted 3D image data RGB' by converting the left-eye image data RGBL and the right-eye image data RGBR according to the time division 3D format method if the complexity signal COMP has the first logic level.

FIG. 12 is an example chart illustrating an example of a 3D format method. Referring to FIG. 12, the 3D formatter 144 may generate the converted 3D image data RGB' of a Nth frame by arranging the left-eye image data of odd-numbered lines on the odd-numbered lines of the Nth frame, the right-eye image data of even-numbered lines on the even-numbered lines of the Nth frame. Also, the 3D formatter 144 may generate the converted 3D image data RGB' of a (N+1)th frame by arranging the left-eye image data of the even-numbered lines on the odd-numbered lines of the (N+1)th frame, and the right-eye image data of the odd-numbered lines on the even-numbered lines of the (N+1)th frame, wherein N is a natural number equal to or more than 1. The 3D formatter 144 may supply the converted 3D image data RGB' to the timing controller 130. (S110)

Also, the 3D formatter 144 may receive the 2D image data and the timing signals from the data expansion unit 141A in the 2D mode. The 3D formatter 144 may receive the mode signal MODE from the host system 150. The 3D formatter 144 may distinguish the 2D mode from the 3D mode according to the mode signal MODE. The 3D formatter 144 may bypass the 2D image data RGB2D and timing signals in the 2D mode. Therefore, the 3D formatter 144 may output the 2D image data RGB2D and timing signals to the timing controller in the 2D mode. (See S111 in FIG. 6.)

The jagging removing unit 143 receives the complexity signal COMP from the complexity calculator 142D. The jagging removing unit 143 generates replaced left-eye image data RGBL' and replaced right-eye image data RGBR' by replacing the left-eye image data RGBL and the right-eye image data RGBR according to the jagging removing method. The jagging removing method of the jagging removing unit 143 is described in FIG. 13.

Figure 13:
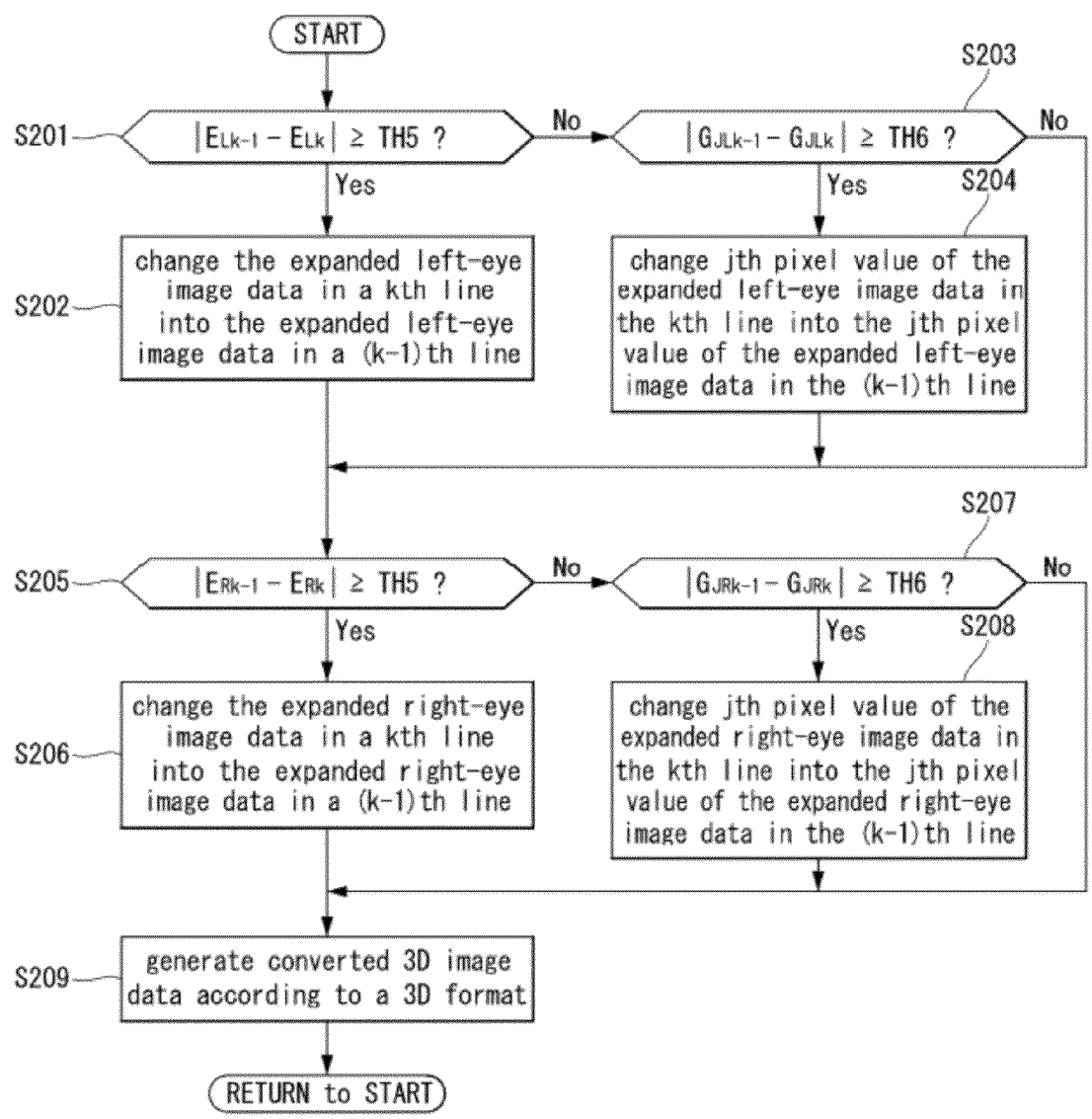
FIG. 13 illustrates a flow chart of a method of removing jagging of a 3D image according to one embodiment.

FIG. 13 illustrates a flow chart of a method for removing jagging of a 3D image according to one embodiment. The jagging removing unit 143 shown in FIG. 5 includes a second data converter 143A (a line converter) and a third data converter 143B (a pixel converter). The second data converter 143A performs steps S201, S202, S205, and S206 shown in FIG. 13. The third data converter 143B performs steps S203, S204, S207, and S208 shown in FIG. 13.

The second data converter 143A may count a number of left edges on a $(k-1)^{th}$ line and a number of left edges on a $k^{th}$ line. Also, the second data converter 143A may count a number of right edges on the $(k-1)^{th}$ line and a number of right edges on the $k^{th}$ line.

With reference to Equation 2 below, the second data converter 143A may calculate whether a first absolute value of a difference between the number of the left edges on the $(k-1)^{th}$ line and the number of the left edges on the $K^{th}$ line is greater than or equal to a fifth threshold value TH5 (edge number threshold value). The second data converter 143A may calculate whether a second absolute value of a difference between the number of the right edges on the $(k-1)^{th}$ line and the number of left edges on the $K^{th}$ line is greater than or equal to the third threshold value TH5. The fifth threshold value TH5 may be appropriately set.

$$|E_{LL-1}-E_{LK}| \geq TH5$$

$$|E_{RK-1}-E_{RK}| \geq TH5 \quad \text{[Equation 2]}$$

In Equation 2, $E_{LK-1}$ indicates a number of the left edges on the $(k-1)^{th}$ line, $E_{LK}$ indicates a number of the left edges on the $k^{th}$ line, $E_{RK-1}$ indicates a number of the right edges on the $(k-1)^{th}$ line, and $E_{RK}$ indicates a number of the right edges on the $k^{th}$ line.

Meanwhile, if the first absolute value is greater than or equal to the fifth threshold value TH5, it indicates that the left edges on the $(k-1)^{th}$ line may be different from the left edges on the $k^{th}$ line. If the second absolute value is greater than or equal to the fifth threshold value TH5, it indicates that the right edges on the $(k-1)^{th}$ line may be different from the right edges on the $k^{th}$ line. Thus, jagging may occur on the $k^{th}$ line and the $(k-1)^{th}$ line of each of the left-eye image and the right-eye image. Therefore, the second data converter 143A may replace the left-eye image data on the $k^{th}$ line with the left-eye image data on the $(k-1)^{th}$ line in order to remove jagging when the first absolute value is greater than or equal to the fifth threshold value TH5. The second data converter 143A may replace the right-eye image data on the $k^{th}$ line with the right-eye image data on the $(k-1)^{th}$ line in order to remove jagging when the second absolute value is greater than or equal to the fifth threshold value TH5. (See S201, S202, S205, and S206 in FIG. 13.)

The third data converter 143B may calculate a third absolute value of a difference between a $j^{th}$ left-eye pixel value of the left-eye image data RGBL on the $(k-1)^{th}$ line and a $j^{th}$ left-eye pixel value of the left-eye image data RGBL on the $k^{th}$ line when the first absolute value is less than the fifth threshold value TH5. The third data converter 143B may calculate a fourth absolute value of a difference between a $j^{th}$ right-eye pixel value of the right-eye image data RGBR on the $(k-1)^{th}$ line and a $j^{th}$ right-eye pixel value of the right-eye image data RGBR on the $k^{th}$ line when the second absolute value is less than the fifth threshold value TH5.

With reference to Equation 3 below, the third data converter 143B may calculate whether the third absolute value is greater than or equal to a sixth threshold value TH6 (pixel value threshold value). The third data converter 143B may calculate whether a fourth absolute value is greater than or equal to the sixth threshold value TH6. The sixth threshold value TH6 may be appropriately set.

$$|G_{JLK-1}-G_{JLK}| \geq TH6$$

$$|G_{JRK-1}-G_{JRK}| \geq TH6 \quad \text{[Equation 3]}$$

In equation 3, $G_{JLK-1}$ indicates the $j^{th}$ left-eye pixel value of the left-eye image data RGBL on the $(k-1)^{th}$ line, and $G_{JLK}$ indicates the $j^{th}$ left-eye pixel value of the left-eye image data RGBL on the $k^{th}$ line. $G_{JRK-1}$ indicates the $j^{th}$ left-eye pixel value of the right-eye image data RGBR on the $(k-1)^{th}$ line, and $G_{JRK}$ indicates the $j^{th}$ right-eye pixel value of the right-eye image data RGBR on the $k^{th}$ line. Each of $G_{JLK-1}$, $G_{JLK}$, $G_{JRK-1}$, and $G_{JRK}$ may be represented as the gray level value. For example, each of $G_{JLK-1}$, $G_{JLK}$, $G_{JRK-1}$, and $G_{JRK}$ may be represented as the gray level value from "G0" to "G255" if input image data is 8 bits.

Meanwhile, if the third absolute value is greater than or equal to the sixth threshold value TH6, it may indicate that one of the $j^{th}$ left-eye pixel value of the left-eye image data RGBL on the $(k-1)^{th}$ line and the $j^{th}$ left-eye pixel value of the left-eye image data RGBL on the $k^{th}$ line is not a left edge. If the third absolute value is greater than or equal to the sixth threshold value TH6, it may indicate that one of the $j^{th}$ right-eye pixel value of the right-eye image data RGBR on the $(k-1)^{th}$ line and the $j^{th}$ right-eye pixel value of the right-eye image data RGBR on the $k^{th}$ line is not a right edge. Thus, jagging may occur at a $j^{th}$ pixel on the $k^{th}$ line and a $j^{th}$ pixel on the $(k-1)^{th}$ line of each the left-eye image and the right-eye image. Therefore, the third data converter 143B may replace the $j^{th}$ left-eye pixel value of the left-eye image data RGBL on the $k^{th}$ line with the $j^{th}$ left-eye pixel value of the left-eye image data RGBL on the $(k-1)^{th}$ line in order to remove jagging if the third absolute value is greater than or equal to the sixth threshold value TH6. The third data converter 143B may replace the $j^{th}$ right-eye pixel value of the right-eye image data RGBR on the $k^{th}$ line with the $j^{th}$ right-eye pixel value of the right-eye image data RGBR on the $(k-1)^{th}$ line in order to remove jagging if the fourth absolute value is equal to or more than the sixth threshold value TH6.

Alternatively, the third data converter 143B may replace the $j^{th}$ left-eye pixel value of the left-eye image data RGBL on the $k^{th}$ line with a value calculated through a interpolation in order to remove jagging if the third absolute value is greater than or equal the sixth threshold value TH6. For example, the third data converter 143B may replace the $j^{th}$ left-eye pixel value of the left-eye image data RGBL on the $k^{th}$ line with an arithmetical mean of the $j^{th}$ left-eye pixel value of the left-eye image data on the $k^{th}$ line and the $j^{th}$ left-eye pixel value of the left-eye image data on the $(k-1)^{th}$ line if the third absolute value is greater than or equal to the sixth threshold value TH6. Also, the third data converter 143B may replace the $j^{th}$ right-eye pixel value of the right-eye image data RGBR on the $k^{th}$ line with a value calculated through the interpolation in order to remove jagging if the fourth absolute value is greater than or equal to the sixth threshold value TH6. For example, the third data converter 143B may replace the $j^{th}$ right-eye pixel value of the right-eye image data RGBR on the $k^{th}$ line with a arithmetical mean of the $j^{th}$ right-eye pixel value of the right-eye image data on the $k^{th}$ line and the $j^{th}$ right-eye pixel value of the right-eye image data on the $(k-1)^{th}$ line if the fourth absolute value is greater than or equal to the sixth threshold value TH6.

Meanwhile, the second data converter 143A and the second data converter 143B may perform no action if the first absolute value is less than the fifth threshold value TH5 and the third absolute value is less than the sixth threshold value TH6. Also, the second data converter 143A and the second data converter 143B may perform no action if the second absolute value is less than the fifth threshold value TH5 and the fourth absolute value is less than the sixth threshold value TH6.

As a result, the third data converter 143B may output the replaced left-eye image data RGBL' which may remove jagging of the left-eye image and the replaced right-eye image data RGBR' which may remove jagging of the right-eye image to the 3D formatter. (See S203, S204, S207, and S208 of FIG. 13.)

The 3D formatter 144 may receive the replaced left-eye image data RGBL' and the replaced right-eye image data RGBR' from the third data converter 143B. The 3D formatter 144 may convert the replaced left-eye image data RGBL' and the replaced right-eye image data RGBR' into the converted 3D image data RGB3D' according to the time division 3D format method. The time division 3D format method of the 3D formatter 144 has already been described with reference to FIG. 12.

For example, the 3D formatter 144 may generate the converted 3D image data RGB3D' of the Nth frame by arranging the replaced left-eye image data RGBL' of odd-numbered lines on the odd-numbered lines of the Nth frame and the replaced right-eye image data RGBR' of even-numbered lines on the even-numbered lines of the Nth frame. Also, the 3D formatter 144 may generate the converted 3D image data RGB3D' of the (N+1)th frame by arranging the replaced left-eye image data RGBL' of even-numbered lines on the odd-numbered lines of the (N+1)th frame and the replaced right-eye image data RGBR' of odd-numbered lines on the even-numbered line of the (N+1)th frame. The 3D formatter 144 may output the converted 3D image data RGB3D' to the timing controller 130 in the 3D mode. (See S209 of FIG. 13.)

The embodiments described herein may remove jagging of a 3D image by applying different algorithms according to a complexity of the 3D image. Specifically, the embodiments may apply only a time division 3D format method if the 3D image is a complicated image, and apply the time division 3D format method after applying a jagging removing method if the 3D image is a simple image. As a result, the embodiments may remove jagging occurring when implementing the 3D image as a pattern retarder method.

Also, the embodiments herein may detect a chat window area of a 3D image, and convert gray scale data of the chat window area in order to prevent the chat window area from being detecting as edges. Therefore, the embodiments herein may improve a readability of alphanumeric characters on the chat window area by removing jagging occurring when implementing the 3D image as a pattern retarder method.

Although the embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing method comprising:
   detecting left edges and right edges of an image by analyzing left-eye image data and right-eye image data;
   detecting a row line as a complicated line if a number of the left edges or the right edges in the row line is greater than or equal to a complicated line threshold value;
   counting a number of complicated lines;
   generating a complexity signal having a first logic level if the number of the complicated lines is greater than or equal to a complexity detection threshold value;
   generating the complexity signal having a second logic level if the number of the complicated lines is less than the complexity detection threshold value;
   generating converted three-dimensional (3D) image data if the complexity signal has the first logic level by arranging the left-eye image data of odd-numbered lines on the odd-numbered lines of a Nth frame, the right-eye image data of even-numbered lines on the even-numbered lines of the Nth frame, the left-eye image data of the even-numbered lines on the odd-numbered lines of a (N+1)th frame, and the right-eye image data of the odd-numbered lines on the even-numbered lines of the (N+1)th frame, wherein N is a natural number; and
   if the complexity signal has the second logic level,
   replacing the left-eye image data on a $k^{th}$ line with the left-eye image data on a $(k-1)^{th}$ line if a first absolute value of a difference between a number of the left edges on the $(k-1)^{th}$ line and a number of the left edges on the $k^{th}$ line is greater than or equal to an edge number threshold value; and
   replacing the right-eye image data on the $k^{th}$ line with the right-eye image data on the $(k-1)^{th}$ line if a second absolute value of a difference between a number of the right-eye edge data on the $(k-1)^{th}$ line and a number of the right-eye edge data on the $k^{th}$ line is greater than or equal to the edge number threshold value, wherein k is a natural number greater than or equal to 2 and less than or equal to n, and wherein n is a vertical resolution of a display panel.

2. The image processing method of claim 1, further comprising:

calculating a third absolute value of a difference between a $j^{th}$ left-eye pixel value of the left-eye image data on the $(k-1)^{th}$ line and a $j^{th}$ left-eye pixel value of the left-eye image data on the $k^{th}$ line if the first absolute value is less than the edge number threshold value; and calculating a fourth absolute value of a difference between $j^{th}$ right-eye pixel value of the right-eye image data on the $(k-1)^{th}$ line and $j^{th}$ right-eye pixel value of the right-eye image data on the $k^{th}$ line if the second absolute value is less than the edge number threshold value, wherein j is a natural number equal to or more than 1 and equal to or less than m, and wherein m is a horizontal resolution of the display panel.

3. The image processing method of claim 2, further comprising:

replacing the $j^{th}$ left-eye pixel value of the left-eye image data on the $k^{th}$ line with the $j^{th}$ left-eye pixel value of the left-eye image data on the $(k-1)^{th}$ line if the third absolute value is greater than or equal to a pixel value threshold value; and replacing the $j^{th}$ right-eye pixel value of the right-eye image data on the $k^{th}$ line with the $j^{th}$ right-eye pixel value of the right-eye image data on the $(k-1)^{th}$ line if the fourth absolute value is greater than or equal to the pixel value threshold value.

4. The image processing method of claim 3, further comprising:

arranging replaced left-eye image data of odd-numbered lines on the odd-numbered lines of a Nth frame, arranging replaced right-eye image data of even-numbered lines on the even-numbered lines of the Nth frame, the replaced left-eye image data of the even-numbered lines on the odd-numbered lines of a (N+1)th frame, the replaced right-eye image data of the odd-numbered lines on the even-numbered lines of the (N+1)th frame, wherein N is a natural number.

5. The image processing method of claim 2, further comprising:

replacing the $j^{th}$ left-eye pixel value of the left-eye image data on the $k^{th}$ line with an arithmetical mean of the $j^{th}$ left-eye pixel value of the left-eye image data on the $k^{th}$ line and the $k^{th}$ left-eye pixel value of the left-eye image data on the $(k-1)^{th}$ line if the third absolute value is greater than or equal to a pixel value threshold value; and replacing the $j^{th}$ right-eye pixel value of the right-eye image data on the $k^{th}$ line to a arithmetical mean of the $j^{th}$ right-eye pixel value of the right-eye image data on the $k^{th}$ line and the $j^{th}$ right-eye pixel value of the right-eye image data on the $(k-1)^{th}$ line if the fourth absolute value is greater than or equal to the pixel value threshold value.

6. The image processing method of claim 1, wherein the detecting left edges and right edges includes:

receiving original 3D image data having original left-eye image data and original right-eye image data;

generating the left-eye image data by expanding the original left-eye image data, and generating the right-eye image data by expanding the original right-eye image data;

converting the left-eye image data into left-eye gray scale data, and converting the right-eye image data into right-eye gray scale data;

detecting at least one chat window area by analyzing the left-eye gray scale data and the right-eye gray scale data; and converting the left-eye gray scale data and the right-eye gray scale data in the chat window area.

7. The image processing method of claim 6, wherein the detecting the chat window area includes:

determining one of the left-eye gray scale data or the right-eye gray scale data as a central gray scale data;

determining a plurality of displacement calculation areas based on the central gray scale data;

setting a mask having a size of p×q on one of the displacement calculation areas, wherein p and q are natural numbers greater than 2;

determining one of gray scale data in the mask as a reference gray scale data;

calculating a displacement from the central gray scale data to the reference gray scale data; and determining that the central gray scale data is in the chat window area if the displacement is zero.

8. The image processing method of claim 7, wherein the converting the left-eye gray scale data and the right-eye gray scale data in the chat window area includes:

if the central gray scale data CD in the chat window area is jth gray scale data on a kth line, replacing the jth gray scale data on the kth line, the jth gray scale data on a (k−1)th line, and the jth gray scale data on a (k+1)th line with an arithmetic mean of the jth gray scale data on the kth line, the jth gray scale data on the (k−1)th line, and the jth gray scale data on the (k+1)th line, wherein j is a natural number greater than or equal to 1 and less than or equal to m which is a horizontal resolution of the display panel, and wherein k is a natural number greater than or equal to 2 and less than or equal to n which is a vertical resolution of the display panel.

9. A stereoscopic image display device, comprising:

a display panel including scan lines and data lines;

an image processor configured to detect a complexity of a three-dimensional (3D) image by using a complexity detector, and convert the 3D image data by applying either a first algorithm or a second algorithm to the 3D image based on the complexity of the 3D image;

a data driver configured to convert the converted 3D image data from the image processor into data voltages and supply the data voltages to the data lines; and a gate driver configured to sequentially supply gate pulses synchronized with the data voltage to the gate lines, wherein the complexity detector includes:

an edge detector configured to detect left edges and right edges by analyzing left-eye image data and right-eye image data, and a complexity calculator configured to detect a row line as a complicated line if a number of the left edges or the right edges in the row line is equal to or more than a complicated line threshold value, and count a number of complicated lines, and generate a complexity signal having a first logic level if the number of the complicated lines is greater than or equal to a complexity detection threshold value, the first logic level indicating that the image is complex, generate the complexity signal having a second logic level if the number of the complicated lines is less than the complexity detection threshold value, the second logic level indicating that the image is simple;

a 3D formatter configured to generate first 3D image data based on the left-eye image data and the right-eye image data using the first algorithm applied to the left-eye image data and the right-eye image data responsive to the complexity signal having the first logic level indicating that the image is complex, wherein the 3D formatter is configured to generate the first 3D image data based on the left-eye image data and the right-eye image data using the first algorithm by, arranging the left-eye image data of odd-numbered lines on the odd-numbered lines of a Nth frame, the right-eye image data of even-numbered lines on the even-numbered lines of the Nth frame, the left-eye image data of the even-numbered lines on the odd-numbered lines of a (N+1)th frame, and the right-eye image data of the odd-numbered lines on the even-numbered lines of the (N+1)th frame, wherein N is a natural number; and a jagging removal unit configured to generate second 3D image data based on the left-eye image data and the right-eye image data using the second algorithm applied to the left-eye image data and the right-eye image data responsive to the complexity signal having the second logic level indicating that the image is simple, the second 3D image data distinct from the first 3D image data, wherein the jagging removal unit includes a line converter, the line converter configured to generate the second 3D image data based on the left-eye image data and the right-eye image data using the second algorithm by replacing the left-eye image data on a $k^{th}$ line with the left-eye image data on a $(k-1)^{th}$ line if a first absolute value of a difference between a number of the left edges on the $(k-1)^{th}$ line and a number of the left edges on the $k^{th}$ line is greater than or equal to an edge number threshold value, and replaces the right-eye image data on the $k^{th}$ line with the right-eye image data on the $(k-1)^{th}$ line if a second absolute value of a difference between a number of the right-eye edge data on the $(k-1)^{th}$ line and a number of the right-eye edge data on the $k^{th}$ line is greater than or equal to the edge number threshold value, wherein k is a natural number greater than or equal to 2 and greater than or equal to n, and wherein n is a vertical resolution of a display panel.

10. The stereoscopic image display device of claim 9, wherein the jagging removing unit further includes a pixel converter that calculates a third absolute value of a difference between a $j^{th}$ left-eye pixel value of the left-eye image data on the $(k-1)^{th}$ line and a $j^{th}$ left-eye pixel value of the left-eye image data on the $k^{th}$ line if the first absolute value is less than the edge number threshold value, and calculates a fourth absolute value of a difference between $j^{th}$ right-eye pixel value of the right-eye image data on the $(k-1)^{th}$ line and $k^{th}$ right-eye pixel value of the right-eye image data on the $k^{th}$ line if the second absolute value is less than the edge number threshold value, wherein j is a natural number greater than or equal to 1 and less than or equal to m, and wherein m is a horizontal resolution of the display panel.

11. The stereoscopic image display device of claim 10, wherein the pixel converter replaces the $j^{th}$ left-eye pixel value of the left-eye image data on the $k^{th}$ line with the $j^{th}$ left-eye pixel value of the left-eye image data on the $(k-1)^{th}$ line if the third absolute value is greater than or equal to a pixel value threshold value, and replaces the $j^{th}$ right-eye pixel value of the right-eye image data on the $k^{th}$ line with the $j^{th}$ right-eye pixel value of the right-eye image data on the $(k-1)^{th}$ line if the fourth absolute value is greater than or equal to the pixel value threshold value.

12. The stereoscopic image display device of claim 11, wherein the 3D formatter is further configured to arrange replaced left-eye image data of odd-numbered lines on the odd-numbered lines of a Nth frame, replaces right-eye image data of even-numbered lines on the even-numbered lines of the Nth frame, the replaced left-eye image data of the even-numbered lines on the odd-numbered lines of a (N+1)th frame, the replaced right-eye image data of the odd-numbered lines on the even-numbered lines of the (N+1)th frame, wherein N is a natural number.

13. The stereoscopic image display device of claim 10, wherein the pixel converter replaces the $j^{th}$ left-eye pixel value of the left-eye image data on the $k^{th}$ line with an arithmetical mean of the $j^{th}$ left-eye pixel value of the left-eye image data on the $k^{th}$ line and the $j^{th}$ left-eye pixel value of the left-eye image data on the $(k-1)^{th}$ line if the third absolute value is greater than or equal to a pixel value threshold value, and replaces the $j^{th}$ right-eye pixel value of the right-eye image data on the $k^{th}$ line to a arithmetical mean of the $j^{th}$ right-eye pixel value of the right-eye image data on the $k^{th}$ line and the $j^{th}$ right-eye pixel value of the right-eye image data on the $(k-1)^{th}$ line if the fourth absolute value is greater than or equal to the pixel value threshold value.

14. The stereoscopic image display device of claim 9, wherein the image processor further includes a chat window detector that detects chat window area of the 3D image, wherein the chat window detector includes:

a data expansion unit that receives original 3D image data having original left-eye image data and original right-eye image data, and generates the left-eye image data by expanding the original left-eye image data, and generates the right-eye image by expanding the original right-eye image data;

a gray scale converter that converts the left-eye image data into left-eye gray scale data, and converts the right-eye image data into right-eye gray scale data;

a displacement calculator that detects at least one chat window area by analyzing the left-eye gray scale data and the right-eye gray scale data; and a chat window converter that converts the left-eye gray scale data and the right-eye gray scale data in the chat window area.

15. The stereoscopic image display device of claim 14, wherein the displacement calculator configured to:

determine one of the left-eye gray scale data or the right-eye gray scale data as a central gray scale data;

determine a plurality of displacement calculation areas based on the central gray scale data;

set a mask of size p×q pixels on one of the displacement calculation areas, wherein p and q are a natural number more than 2;

determine one of gray scale data in the mask as a reference gray scale data;

calculate a displacement from the central gray scale data to the reference gray scale data; and determine that the central gray scale data is in the chat window area if the displacement is zero.

16. The stereoscopic image display device of claim 15, wherein the chat window converter configured to: replace the jth gray scale data on the kth line, the jth gray scale data on a (k−1)th line, and the jth gray scale data on a (k+1)th line with an arithmetic mean of the jth gray scale data on the kth line, the jth gray scale data on the (k−1)th line, and the jth gray scale data on the (k+1)th line if the central gray scale data CD in the chat window area is jth gray scale data on a kth line, wherein j is a natural number greater than or equal to 1 and less than or equal to m which is a horizontal resolution of the display panel, and wherein k is a natural number greater than or equal to 2 and less than or equal to n which is a vertical resolution of the display panel.

* * * * *